Oct. 20, 1970

L. T. DAVIS 3,535,546

CURRENT MODE LOGIC

Filed Feb. 12, 1968

2 Sheets-Sheet 1

INVENTOR.
LESTER T. DAVIS

BY Thomas G. Devine

ATTORNEY

Oct. 20, 1970 L. T. DAVIS 3,535,546

CURRENT MODE LOGIC

Filed Feb. 12, 1968 2 Sheets-Sheet 2

INVENTOR.
LESTER T. DAVIS
BY Thomas G. Devine
ATTORNEY

United States Patent Office 3,535,546

Patented Oct. 20, 1970

3,535,546

CURRENT MODE LOGIC

Lester T. Davis, Chippewa Falls, Wis., assignor to Control Data Corporation, Minneapolis, Minn., a corporation of Minnesota Filed Feb. 12, 1968, Ser. No. 704,791
Int. Cl. H03k *19/20*
U.S. Cl. 307—216 7 Claims

ABSTRACT OF THE DISCLOSURE

An "exclusive OR" logic circuit utilizing current mode design techniques, and featuring a transistor clamp circuit which allows variable loading parameters to be imposed upon a standard circuit design is described.

This invention relates generally to electronic logic circuitry and more particularly to a transistor circuit for performing the "exclusive OR" logic function. The invention utilizes novel combinations of circuits which have come to be known as "current mode" circuits.

The "exclusive OR" logic function is one of the more frequently recurring logic functions which are utilized in the computer art. The need for this type of circuit has arisen sufficiently often as to result in many independent investigations which have attempted to design economical "exclusive OR" circuits to satisfy particular design requirements utilizing particular transistor circuit conventions. As a result, "exclusive OR" circuits have been invented for resistor transistor logic (RTL), diode transistor logic (DTL), and other types of saturated mode or unsaturated mode circuits.

The logic requirement of any "exclusive OR" circuit is to provide an output signal only when the input signals are dissimilar. This is demonstrated in the following table:

| Input A | Input B | Input B |
|---|---|---|
| 0 | 0 | 0 |
| 0 | 1 | 1 |
| 1 | 0 | 1 |
| 1 | 1 | 0 |

As can be seen from the above table, the output function is a logical "one" only when either, but not both, of the input functions are a logical "one." This function finds great utility in parity circuits, adders, and other areas of the computer art.

High switching speed can be obtained by eliminating storage delay time caused by transistor operation in its saturation region. High switching speed can also be obtained by limiting the voltage excursion of the transistor output, which can be accomplished very effectively by operating in the current mode.

Therefore, it is an object of this invention to provide an "exclusive OR" circuit utilizing current mode circuit design techniques.

A further object of this invention is to provide an economical circuit design using a single type of transistor and a minimum of components which is capable of high speed operation under variable loading conditions.

Another object of this invention is to provide a circuit which requires only a single low voltage power supply for its operation.

These and other objects will become more fully apparent from the following detailed description taken in conjunction with the accompanying drawings, in which.

Figure 1:
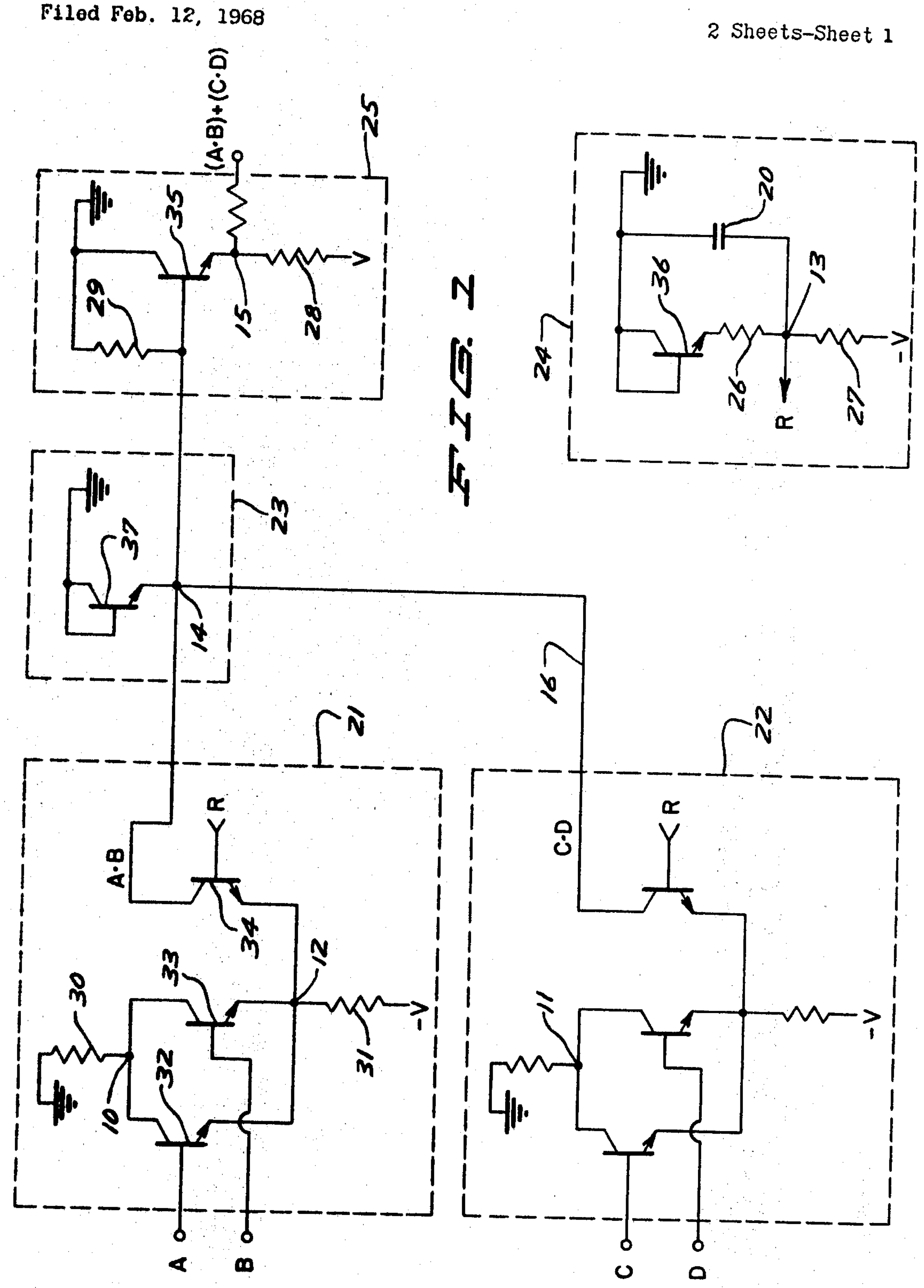
FIG. 1 is a schematic digram illustrating several current mode circuits interconnected to perform a typical logical function.

Referring first to FIG. 1, an interconnection of current mode circuits for performing logical functions is shown wherein three levels of logical combinations can be performed through the use of one of the features of this invention, namely voltage clamp circuit 23. The output of current mode circuit 21 is connected with the output of current mode circuit 22 at voltage clamp circuit 23, and is further connected to emitter follower circuit 25, which translates the signal volage levels back to their standard values. Reference voltage circuit 24 provides a reference voltage value for utilization in the current mode circuits as will be further explained below. Current mode circuits 21 and 22 are identical in their operation; therefore, it will only be necessary to described the detailed operation of one of them. The operation of current mode circuit 21 will be described for this purpose.

The following circuit values for current mode circuit 21 have been successively utilized in a specific embodiment of this invention:

| | |
|---|---|
| Resistor **30** | 43 ohms. |
| Resistor **31** | 120 ohms. |
| Transistor **32** | 2N2369. |
| Transistor **33** | 2N2369. |
| Transistor **34** | 2N2369. |
| Voltage source V | —4 volts. |
| Reference voltage R | —1.2 volts. |

The input signal voltage levels are —1.6 volts, which represents a logical 1, and —0.8 volt, which represents a logical zero. Either of these input voltage signals may be applied to input terminals A and B. It should be recognized that additional input terminals could be added by merely providing additional transistors with their collectors connected to junction point 10, their emitters connected to junction point 12, and their bases connected to the additional input terminals; however, the two transistors 32 and 33 are sufficient to explain the operation of this circuit. Reference voltage R is selected to be approximately midway between the signal voltage values for reasons which will become more apparent in the following detailed discussion.

If both inputs A and B of current mode circuit 21 are at —1.6 volts, the transistors 32 and 33 are rendered substantially nonconducting. Reference voltage R, applied to the base of transistor 34, causes transistor 34 to conduct current from its external collector circuit through resistor 31 to the negative voltage source V. The voltage at junction point 12 is approximately —2.0 volts as a result of the current flow through transistor 34, and transistors 32 and 33 are thereby rendered substantially non-conductive. The base-emitter characteristics of the transistors utilized in this circuit require that a forward bias potential of approximately 0.8 volt be present across the base-emitter junction before substantial collector current can flow through the transistor. Forward base-emitter potentials of less than 0.8 volt are insufficient to allow significant collector current flow, and when this condition is present the transistor will be referred to as being in the OFF state. When the forward base-emitter potential exceeds 0.8 volt, the transistor will be referred to as being in the ON state. Using this terminology, and when inputs A and B are both at —1.6 volts, transistors 32 and 33 are in the OFF state and transistor 34 is in the ON state. Under these conditions, the collector of transistor 34 is held at a potential of approximately —0.8 volt. If either input A or input B is switched to —0.8 volt, transistor 32 or 33 respectively will switch to the ON state. This causes the voltage at junction point 12 to raise to approximately —1.6 volts which in turn causes transistor 34 to switch to the OFF state, as there is insufficient forward base-emitter potential to maintain transistor 34 in the ON state. Current flow will then occur through resistor 30, transistor 32 or 33, and resistor 31 to the negative voltage source V. The voltage at the collector of transistor 34 rises to approximately 0 volt.

Referring to resistor 31, it can be seen that there is always current flow through this resistor, either from the right-hand path formed by transistor 34 or from the left-hand path formed by either transistor 32 or transistor 33 or both. This concept of providing a relatively constant current through resistor 31 and merely switching the source from which it is derived, forms the basis for the name "current mode" which this type of circuit has been given. The resistor values are selected so that under conditions of maximum current flow no transistor is operating in the saturated mode. A more detailed analysis of this aspect of current mode circuit operation is given in the "Motorola Switching Transistor Handbook," first edition 1963, at page 37, and therefore will not be presented here.

In the foregoing description, it should be noted that the collector of transistor 34 is at a potential of approximately —0.8 volt when inputs A and B are both at a —1.6-volt potential, and the collector of transistor 34 is at a potential of approximately 0 volt when either input A or B, or both, is at a potential of —0.8 volt. Thus it can be seen that the input signal voltage swing between —0.8 volt and —1.6 volts is shifted to a voltage swing between 0 and —0.8 volt at the collector of transistor 34. In order to use this output signal in subsequent logical circuits, it is necessary to convert it back into the "standard" voltage levels of —0.8 volt and —1.6 volts. This is accomplished by connecting the output of transistor 34 to an emitter follower circuit 25, which circuit provides a —0.8-volt output when the collector of transistor 34 is 0 volt, and a —1.6-volt output when the collector of transistor 34 is —0.8 volt. Considering the combination of circuits 21 and 25, the output of circuit 25 is —1.6 volts whenever both input A and input B are at a —1.6-volt potential, and the output of circuit 25 is —1.8 volt for any other combination of standard voltages at inputs A and B. These circuits therefore perform the logical AND function, yielding a logical 1 output whenever input A and input B are logical 1's. The foregoing discussion ignores the effect of circuit 22 upon the logical output, and has effectively assumed that the connection of circuit 22 at junction point 14 is non-existent. The effect of circuit 22, as well as the function of clamp circuit 23, will now be further discussed in detail.

Current mode circuit 22 has input terminals C and D and output line 16. The operation of circuit 22 with respect to its inputs is identical to that of circuit 21. Therefore, when logical 1's are present at both input terminals C and D, the signal on output line 16 is —0.8 volt. This signal is coupled to emitter follower 25 via the connection at junction point 14 to cause the voltage at junction point 15 to go to —1.6 volts, which represents a logical 1 output from circuit 25. Therefore, by connecting the outputs from circuit 21 and circuit 22 together at junction point 14, a logical OR function is formed: a logical 1 output is obtained if either inputs A and B or C and D are logical 1's.

Additional current mode logic circuits similar to circuits 21 and 22 could be added to create additional terms in the *or* logic function by merely connecting their output lines to junction point 14. The use of this junction point to perform logic OR functions is made possible by means of clamp circuit 23. This circuit is comprised of a transistor 37 with its collector and base terminals connected to ground and its emitter connected to junction point 14. Transistor 37 provides current for circuits connected to junction point 14 and allows the number of such circuits which are connected at this point to be very flexible. If transistor 37 were not connected as shown, the current requirements for circuits connected at junction point 14 would have to be supplied through resistor 29. However, the voltage drop across resistor 29 would vary as the number of circuits for which it supplies current varies, thereby causing the emitter follower output voltage at junction point 15 to correspondingly vary. This variation, and the output voltage of the emitter follower 25, would create intolerable signal variations when a plurality of circuits of this type were inter-connected as is commonly done in the computer art. In addition, if the voltage drop across resistor 29 were permitted to vary as the number of current mode circuits which are connected to junction point 14 may vary, a likelihood exists that the potential at junction point 14 could drop to —1.2 volts, or equal to the reference voltage potential applied to the base of transistor 34 and other transistors similarly situated. This condition would cause transistor 34 and other similar transistors to become saturated and would detrimentally affect the speed characteristics of the circuits. Voltage clamp 23 eliminates this problem by acting as a current source for a plurality of current mode circuits and restricting the voltage at junction point 14 from dropping below —0.8 volts. A diode could also be used as a voltage clamp by connecting its anode to ground and its cathode to junction point 14, but a transistor has been found to give superior performance in terms of its response to high switching speeds. The transistor chosen for this application is the same type as all other transistors used in the circuits, thereby yielding an economy by reducing the number of different components required for circuit operation.

Emitter follower 25 is comprised of transistor 35 and emitter resistor 28. Line termination resistor 29 is illustrated in FIG. 1 as a component part of emitter follower 25. Resistor 29 serves as a biasing means for transistor 35, but also serves as a biasing means for transistors in current mode circuits 21, 22, etc., where it is connected to the collectors of transistors such as transistor 34. The emitter potential of transistor 35 is approximately 0.8 volt more negative than the base potential of transistor 35, and follows the voltage excursions which occur at the base of transistor 35. This voltage offset is sufficient to return the signal voltage to the standard voltage level, and the output of emitter follower circuit 25 is connected to junction point 15 to provide a means for connecting the standard output voltage signals to subsequent current mode logic circuits. The following circuit values for emitter follower circuit 25 have been successively utilized in a specific embodiment of this invention:

| | |
|---|---|
| Resistor 29 | 51 ohms. |
| Resistor 28 | 270 ohms. |
| Transistor 35 | 2N2369. |

Reference voltage circuit 24 provides a means for obtaining a reference voltage potential R of —1.2 volts for use in a plurality of current mode circuits. The circuit comprises a transistor 36 with grounded base and collector and an emitter connected to a voltage divider network consisting of resistors 26 and 27. Resistors 26 and 27 are connected at junction 13 and the value of these resistors is selected to provide a voltage potential at junction point 13 of —1.2 volts. Capacitor 21 is also connected to junction point 13 to stabilize the reference voltage potential and eliminate transient effects caused by loading changes. The —1.2-volt reference voltage potential R is transferred from junction point 13 via conductors to the base of transistor 34 and to the base of other transistors which are similarly located in other current mode circuits.

From the foregoing description, it is apparent that current mode logic can be easily adapted to perform the AND and OR logic functions, and various interconnections of current mode circuits can be used to form complex logical combinations. As FIG. 1 illustrates, the AND function is formed at junction point 12 within a current mode circuit; the OR function is formed at junction point 14 by interconnecting two or more current mode circuits. Although not shown on FIG. 1, it is possible to interconnect the outputs of a plurality of emitter followers 25 to further form the logical AND function. This is accomplished by connecting the emitters of a plurality of transistors 35 together at junction point 15, the resultant logical function being the AND combination of each of the individual emitter follower output logical functions.

Another feature of current mode circuits which make them attractive for use in computer circuits is that the complement of the logical AND function performed by a current mode circuit is always available along with the true logic function. For example, in FIG. 1, the logical AND combination of inputs A and B are formed at the collector output of transistor 34. The complement of this function, $\overline{A}\cdot\overline{B}$ is available at junction point 10. Therefore, if a need exists for utilizing the complementary logical function, it is readily available in the current mode circuit. Likewise, the output from current mode circuit 22 is $C\cdot D$, but the complement of this output, $\overline{C}\cdot\overline{D}$, is available at junction point 11 for use whenever it may be required. Naturally, when connections are made to junctions points such as 10 or 11, the same restrictions as to loading occur and clamp circuits such as clamp circuit 25 may be utilized to restrict the voltage drop so that the standard signal voltages will appear at the appropriate emitter follower outputs.

Figure 2:
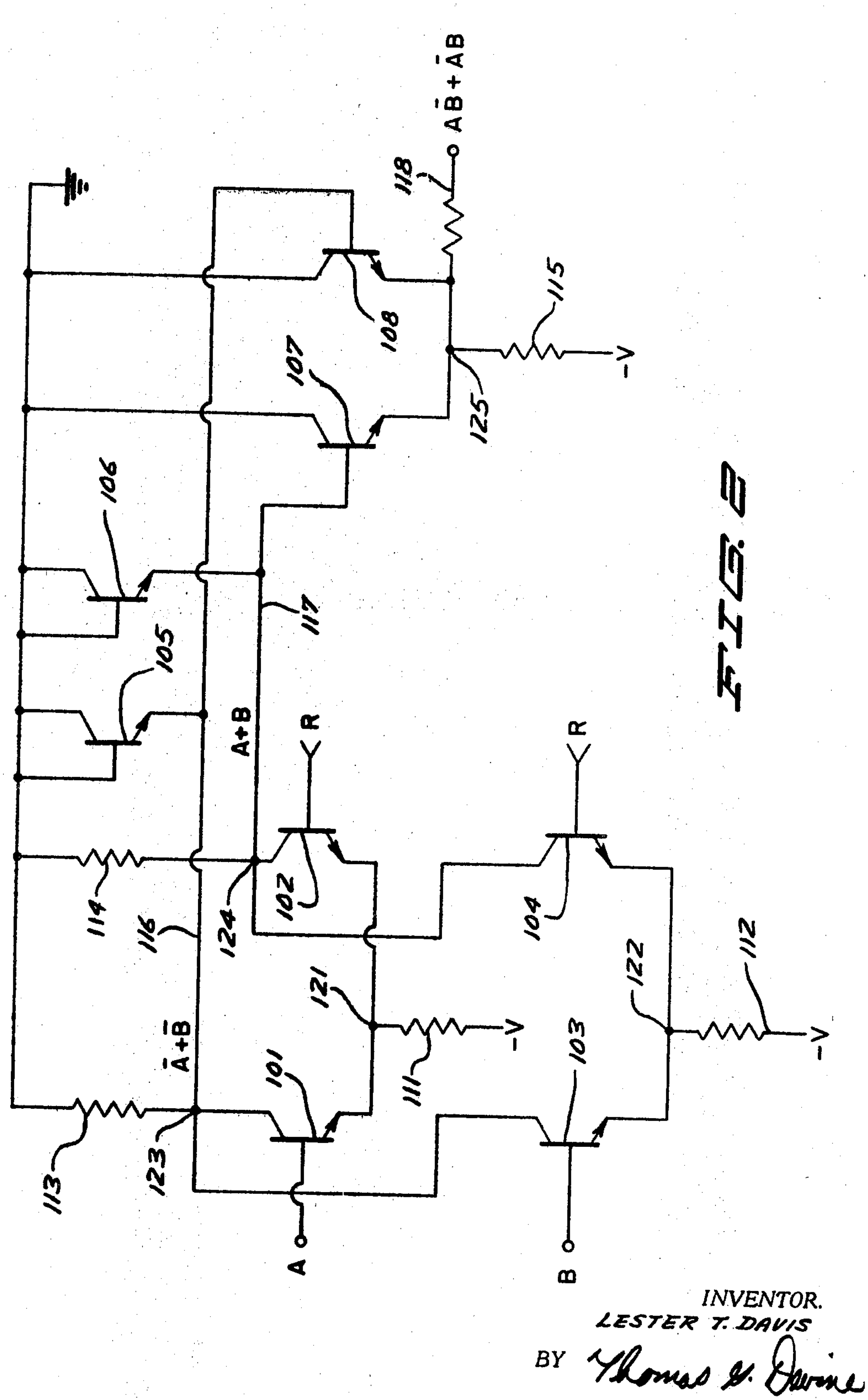
FIG. 2 is a schematic diagram of an "exclusive OR" circuit embodying the invention.

Referring now to FIG. 2, a specific embodiment of the invention is shown. The reference voltage circuit which is used to derive the reference voltage R is not shown on this figure, as it has been illustrated as circuit 24 in FIG. 1. The notation R in FIG. 2 indicates a connection to the reference voltage value of −1.2 volts wherever it occurs. Likewise, the notation −V indicates the connection of a voltage source, typically −4 volts, wherever the notation is present. The circuit of FIG. 2 illustrates a novel combination of current mode circuits wired to form the logical "exclusive OR" function.

The following circuit values for components shown in FIG. 2 have been successively utilized in the specific embodiment of this invention:

| | |
|---|---|
| Transistors **101–108** | 2N2369. |
| Resistor **111** | 120 ohms. |
| Resistor **112** | 120 ohms. |
| Resistor **113** | 43 ohms. |
| Resistor **114** | 51 ohms. |
| Resistor **115** | 270 ohms. |

The signal voltage levels which may appear at either input A or input B may be −0.8 volt, representative of a logical 0, or −1.6 volts, representative of a logical 1. When a 0 is present at terminal A, transistor 101 is rendered substantially conductive and transistor 102 is rendered substantially non-conductive. The corresponding voltage at junction point 121 is −1.6 volts, and since the base of transmitter 102 is held at the reference potential of −1.2 volts, there is insufficient forward base-emitter voltage to cause transistor 102 to become substantially conductive. As was explained previously, this condition will be referred to as the OFF state, and the conductive condition for transistor 101 in this example will be referred to as the ON state. With transistor 101 in the ON state, the voltage at junction point 123 is approximately −0.8 volt. With transistor 102 in the OFF state, the voltage at junction point 124 is approximately zero volts. This voltage is coupled to the base of emitter follower transistor 107 via line 117, and the voltage at junction point 123 is coupled to the base of emitter follower transistor 108 via line 116. Transistors 101 and 102 will always be in opposite states, dependent upon the input signal A.

Transistor 103 has input signal B applied to its base, and has its collector wired to junction point 123 in common with the collector of transistor 101. Transistor 104 has its base wired to the reference voltage potential of −1.2 volts and its collector wired to the junction point 124 in common with the collector for transistor 102. Transistors 103 and 104 are always in opposite states, dependent upon the input signal B. If transistor 103 is in the ON state, the voltage at junction point 123 is approximately −0.8 volt; since this causes transistor 104 to be in the OFF state, the voltage at junction point 124 is approximately zero volts, ignoring for the moment the effect of transistor 102. Considering the voltage at junction point 123, it is apparent that it will have a negative value when either transistor 101 or transistor 103 is in the ON state, and will have a value of approximately zero volts when both transistors 101 and 103 are in the OFF state. The negative value of the voltage swing at junction point 123 is limited to approximately −0.8 volt by the transistor clamp circuit comprised of transistor 105, which circuit has been described previously.

Considering the voltage at junction point 124, it is apparent that it will have a negative value when either transistor 102 or transistor 104 is in the ON state. The voltage at junction point 124 will be approximately zero volts when both transistors 102 and 104 are in the OFF state. The negative voltage swing at junction point 124 is limited to approximately −0.8 volt by the transistor clamp circuit comprised of transistor 106.

Since the voltage at junction point 123 is connected to the base of transistor 108 via line 116, transistor 108 will be responsive to both input signals A and B. With both transistors 101 and 103 in the OFF state, the voltage at junction point 123 is approximately zero, thereby causing transistor 108 to operate in the ON state. Similarly, if both transistors 102 and 104 are in the OFF state the voltage at junction point 124 is approximately zero volts and this voltage, coupled to the base of transistor 107 via line 117, causes transistor 107 to be in the ON state. If either transistor 107 or transistor 108 is in the ON state, the voltage at junction point 125 is approximately −0.8 volt, representative of a logical 0. If both transistors 107 and 108 are in the OFF state, the voltage at junction point 125 is −1.6 volts, representative of a logical 1. Therefore, the output voltage on line 118 is dependent upon the combinations of input signals A and B. This is illustrated in the following table, which shows the conductive state of each transistor for all combinations of the input signals.

| Inputs | | Transistors | | | | | | Output 118 |
|---|---|---|---|---|---|---|---|---|
| A | B | 101 | 102 | 103 | 104 | 107 | 108 | |
| 0 | 0 | ON | OFF | ON | OFF | ON | OFF | 0 |
| 0 | 1 | ON | OFF | OFF | ON | OFF | OFF | 1 |
| 1 | 0 | OFF | ON | ON | OFF | OFF | OFF | 1 |
| 1 | 1 | OFF | ON | OFF | ON | OFF | ON | 0 |

The table illustrates that transistor 108 is OFF when either transistor 101 or transistor 103 is ON, and transistor 107 is OFF when either transistor 102 or 104 is ON. The chart also illustrates that a logical 1 output occurs only when transistors 107 and 108 are both in the OFF state. This occurs only when inputs A and B are dissimilar, i.e., only when a logical 1 is present at input A *or* input B, *but not both*. The output on line 118 is therefore the exclusive OF function of the inputs.

The apparatus disclosed herein is an example of an embodiment in which the inventive features of this disclosure may be utilized, and it will become apparent to one skilled in the art that certain modifications may be made within the spirit of the invention as defined by the appended claims.

What is claimed is:

1. An exclusive OR logic circuit comprising:

(a) a first current mode circuit having a first pair of input terminals one of which is connected to a reference voltage and the other of which is adapted to receive an input signal, the input signal having a first polarity relative to the reference voltage designated a binary zero state and a second polarity opposite to the first polarity relative to the reference voltage designated a binary one state, the circuit having a pair of output terminals, one terminal providing a true output from the circuit and the other a complimentary output from the circuit;

(b) a second current mode circuit having a second pair of input terminals one of which is connected to a reference voltage and the other of which is adapted to receive the input signal, the circuit having a true output and a complimentary output, the true output of the second current mode circuit being connected to the true output of the first current mode circuit and the complimentary output of the second current mode circuit being connected to the complimentary output of the first current mode circuit; and (c) a third current mode circuit having a third pair of input terminals one of which is connected to the true output of the combined first and second current mode circuits and the other connected to the complimentary output of the combined first and second current mode circuits, the third current mode circuit providing signal level translation means and producing an output signal representative of a binary one when the input singals to one but not both of the first and second current mode circuits is a one.

2. An exclusive OR logic circuit as claimed in claim 1 wherein the current mode circuit comprises:

(a) first and second transistors, each having an emitter, base, and collector electrode, the base of the first transistor receiving the input signal, the base of the second transistor being connected to a reference voltage, the collectors of the first and the second transistors each being connected to a first source of voltage through first and second collector resistances;

(b) third and fourth transistors, each having an emitter, base, and collector electrode, the base of the third transistor adapted to receive the input signal, the base of the fourth transistor being connected to a reference voltage, the collector of the third transistor being connected to the first source of voltage through the first collector resistance and the collector of the fourth transistor being connected to the first source of voltage through the second collector resistance;

(c) means for directly interconnecting the emitters of the first and second transistors and further connecting them to a second source of voltage through a single emitter resistance; and (d) means for directly interconnecting the emitters of the third and fourth transistors and further connecting them to the second source of voltage through a single emitter resistance.

3. An exclusive OR logic circuit as claimed in claim 2 wherein the third current mode logic circuit further comprises:

(a) fifth and sixth transistors, each having an emitter, base, and collector electrode, and having their collector electrodes connected to the first source of voltage, and having their emitter electrodes directly interconnected and further connected to the second source of voltage through a single emitter resistance;

(b) means for connecting the basc electrode of the fifth transistor to the collector electrodes of the first and third transistors, and means for connecting the base electrode of the sixth transistor to the collector electrodes of the second and fourth transistors;

(c) output means for transmitting an output signal, connected to the common emitter connection of the fifth and sixth transistors.

4. An exclusive OR logic circuit as claimed in claim 3 further comprising transistor clamp circuits connected to the true and complementary output terminals, the clamp circuits limiting the voltage excursion at the true and complementary outputs.

5. An exclusive OR logic circuit as claimed in claim 4 wherein each transistor clamp circuit comprises:

(a) a base electrode connected to the first voltage source;

(b) a collector electrode connected to the clamp transistor base electrode;

(c) an emitter electrode connected to the base electrode of either the fifth or sixth transistor.

6. An exclusive OR logic circuit comprising (a) a first pair of transistors each having base, emitter and collector electrodes, and having their emitter electrodes directly coupled to form a differential amplifier, and having one base electrode connected to an input signal terminal and the second base electrode connected to a source of reference potential;

(b) a second pair of transistors each having base, emitter and collector electrode, and having their emitter electrodes directly coupled to form a differential amplifier, and having one base electrode connected to an input signal terminal and the second base electrode connected to a source of reference potential;

(c) means for direct-coupling the collectors of the signal receiving transistors of the first and second pair to a first collector load resistor, and means for direct-coupling the collectors of the reference-potential receiving transistors to a second collector load resistors;

(d) transistor clamp means for limiting the voltage drop across the first collector load resistor;

(e) transistor clamp means for limiting the voltage drop across the second collector load resistor;

(f) a third pair of transistors each having base, emitter and collector electrodes, and having their emitter electrodes directly coupled to form a differential amplifier, and having the first base electrode connected to the collectors of the signal-receiving transistors, of the first and second transistor pair, and having the second base electrode connected to the collectors of the reference-potential receiving transistors of the first and second transistor pair.

7. An exclusive OR transistor circuit comprising:

(a) first and second transistors, each having a base electrode connected to an input terminal adapted to receive voltage signals representative of logical binary symbols, and each having a collector electrode connected through a common collector resistor to a voltage source, and each having an emitter electrode;

(b) third and fourth transistors, each having a base electrode connected to a reference voltage source, each having a collector electrode connected through a common collector resistor to a voltage source, and each having an emitter electrode;

(c) means for interconnecting the emitter electrodes of the first and third transistors through a common emitter resistor to a voltage source:

(d) means for interconnecting the emitter electrodes of the second and fourth transistors through a common emitter resistor to a voltage source;

(e) fifth and sixth transistors, each having a collector electrode connected to a voltage source, and each having an emitter electrode connected through a common emitter resistor to a voltage source, and each having a base electrode;

(f) means for connecting the collector electrodes of the first and second transistors to the base electrode of the fifth transistor;

(g) means for connecting the collector electrodes of the third and fourth transistors to the base electrode of the sixth transistor;

(h) transistor clamp means comprising a transistor having its base and collector electrodes connected to a voltage source and its emitter electrode connected to the base of the fifth transistor;

(i) transistor clamp means comprising a transistor having its base and collector electrodes connected to a voltage source and its emitter electrode connected to the base of the sixth transistor;

(j) output means connected to the emitter electrode of the fifth and sixth transistors for providing an output signal.

References Cited

UNITED STATES PATENTS

| | | | |
|---|---|---|---|
| 3,016,466 | 1/1962 | Richards | 307—216 |
| 3,094,614 | 6/1963 | Boyle | 307—216 |
| 3,277,289 | 10/1966 | Buelow et al. | 307—216 |
| 3,412,265 | 11/1968 | Cornish | 307—216 |

D. D. FORRER, Primary Examiner

HAROLD A. DIXON, Assistant Examiner

U.S. Cl. X.R.

307—215, 218, 237